Aug. 4, 1953 P. P. DEMAY 2,647,538
MANUALLY AND FLUID-PRESSURE OPERATED VALVE
Filed Sept. 18, 1947 2 Sheets-Sheet 1
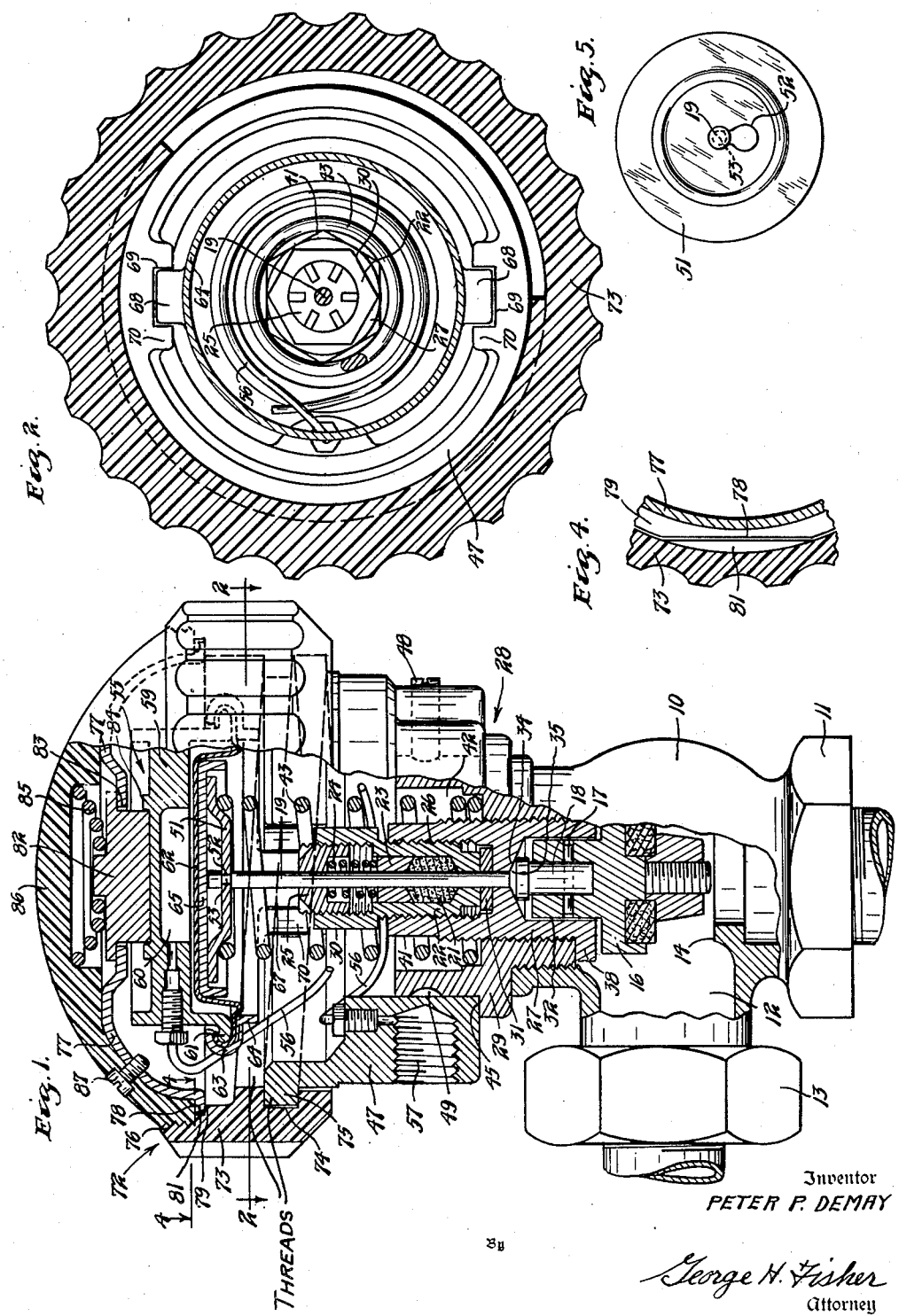
Inventor
PETER P. DEMAY
George H. Fisher
Attorney Aug. 4, 1953          P. P. DEMAY          2,647,538
MANUALLY AND FLUID-PRESSURE OPERATED VALVE
Filed Sept. 18, 1947          2 Sheets—Sheet 2
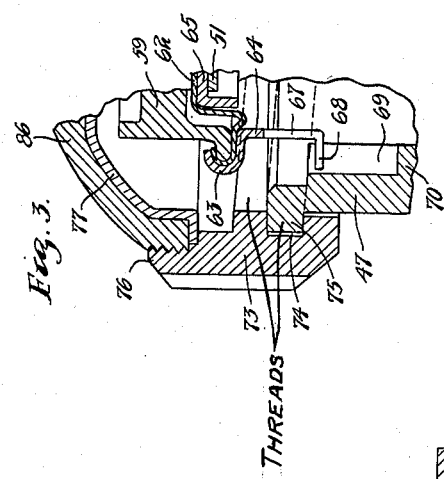
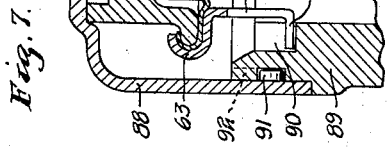
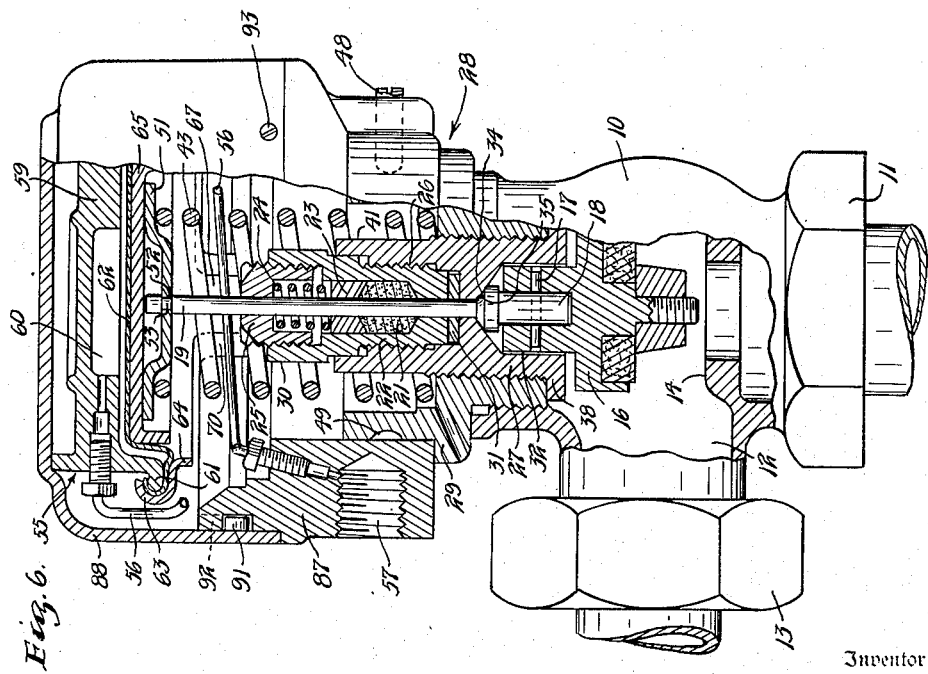
Inventor
PETER P. DEMAY
By
George H. Fisher
Attorney Patented Aug. 4, 1953

2,647,538

UNITED STATES PATENT OFFICE 2,647,538

MANUALLY AND FLUID-PRESSURE OPERATED VALVE

Peter P. Demay, Chicago, Ill., assignor to Minneapolis-Honeywell Regulator Company, Minneapolis, Minn., a corporation of Delaware Application September 18, 1947, Serial No. 774,847

16 Claims. (Cl. 137—641)

The present invention relates to valves for steam or hot water heating systems that can be either pneumatically or manually operated and that can be repacked with the heating system in operation.

The prior art valves cannot be repacked without shutting off the pipes leading to and from the valve being worked on, this generally requiring that either a zone or the entire heating system be shut-off, with an attendant loss of time and inconvenience. The present valve construction is intended to alleviate these difficulties by permitting repacking without shutting off the heating system or any valves other than the one being worked on. In addition the present valve can be manually closed, if desired, regardless of the controlling action of its pneumatic motor.

It is thus a principal object of this invention to provide an improved valve especially suited for steam or hot water heating systems.

It is a further object to provide a valve that can be automatically operated or that can be manually closed if desired.

It is an additional object to provide a valve that can be closed by means other than the normal actuating means and that can be repacked while the valve is under pressure.

It is also an object to provide a pressure actuated valve that is relatively small and compact and that is easy to construct and maintain.

It is a further object to provide an adjustable valve wherein the operating stem is protected from excessive stresses so that it can be made relatively small and easily movable.

It is also an object to provide a motor actuated valve wherein the motor is thermally insulated from the valve body, thereby prolonging the life of the motor parts and increasing the reliability of the device.

It is another object to provide a valve having a pneumatic motor including a diaphragm designed to permit considerable movement.

These and other objects will become apparent upon a study of the following specification and drawings wherein:

Figure 1 is an elevation view, with parts in section, of a manually closeable pneumatically operable valve.

Figure 2 is a sectional view on the line 2—2 of Figure 1.

Figure 3 is a partial sectional elevation showing the guide means of Figures 1 and 2.

Figure 4 is a partial sectional view taken on the line 4—4 of Figure 1.

Figure 5 is a plan view of a spring retainer attached to the valve stem.

Figure 6 is an elevation view, with parts in section, of a modification of the valve shown in Figure 1.

Figure 7 is a partial sectional elevation similar to Figure 3 but relating to Figure 6.

The valve shown by Figures 1 to 5, inclusive, is designed for normal operation by a pneumatic control system but it can be manually closed at any time by suitably rotating its cap structure. The modification shown in Figures 6 and 7 is generally similar to the valve above described excepting that it lacks the manual closing feature and, as it has many parts in common with the above preferred embodiment, the like parts are similarly numbered.

In Figure 1, valve body 10 is of the conventional angle type construction generally preferred for steam or hot water radiators but it may be, obviously, of any suitable shape or type. Valve body 10 includes an inlet connection 11, a passage 12 and an outlet connection 13, with valve seat 14 being disposed across passage 12. A movable valve member or disc 16 is connected by pin 17 to an enlarged lower end 18 of valve stem 19, said enlarged end 18 either being integral with stem 19 or a separate attached part. Stem 19 is made relatively small in diameter to minimize the effect of variations in the steam pressure and to reduce packing difficulties and packing friction to a minimum. Packing 21, disposed around stem 19, is held in place by a packing retainer sleeve 22, the packing being compressed by a ring 23 urged downwardly by a coil spring 24, the compression of the spring being adjusted by a packing nut 25 threaded into the upper portion of the retaining sleeve 22.

Packing retainer sleeve 22 is screwed down into an upper recess 26 in an inner sleeve 27 forming part of a composite bonnet structure 28, the bonnet structure 28 also including an outer sleeve or upper body portion 29. Retainer sleeve 22 is seated against a gasket 31 disposed at the bottom of the recess 26 of sleeve 27 and is tightened by applying a suitable tool to tool engaging portion 30 of said sleeve.

Sleeve 27 also includes a lower recess 32 of sufficient extent to accommodate the upper portion of the movable valve member 16, the upper portion of this recess including a conical seat portion 34 for forming a sealing engagement with an upper conical surface 35 of the enlarged lower end 18 of valve stem 19, under circumstances to be described. Inner sleeve 27 also includes an outwardly extending bottom flange portion 38 for sealingly engaging the bottom edge of outer sleeve member 29 when the sleeve 27 is screwed upwardly in sleeve 29 as far as said flange 38 will permit. An upper tool engaging portion 41 is formed on sleeve 27 so that it can be readily rotated and tightened in sleeve 29 during assembly and subsequent service operations on the valve.

Outer sleeve 29 is generally cylindrical in shape and is threaded into the upper portion of valve body 10 and, in conjunction with inner sleeve 27, forms the bonnet portion 28 of the valve. A hexagonal portion, not shown, may be formed on 29 for application of a wrench for tightening 29 in body portion 10. Sleeve 29 includes an inner recess 42 for receiving the lower end of a compression spring 43 and an outer recess 45 for receiving the lower end of motor base member 47, the motor base member 47 including a set screw 48 for coacting with a groove 49 in recess 45 to rotatably secure base member 47 to said outer sleeve member 29.

The upper end of spring 43 is engaged by a retainer disc 51 secured by a keyhole slot 52 therein coacting with a reduced or necked-down portion 53 of valve stem 19, this construction being shown in Figures 1 and 5. With the parts assembled as just described, wherein retainer sleeve 22 is threaded into the recess 26 of inner sleeve 27, sleeve 27 is threaded into outer sleeve 29, which in turn is screwed into valve body 10, and with movable valve member 16 attached to stem 19 and stem 19 being held in an uppermost position by spring 43, it is apparent that the upper portion of the valve body is closed off and that valve member 16 is in its wide open position. Further, the valve 16 will be held in that position by spring 43 until a sufficient pressure is exerted on the upper portion of valve stem 19 to overcome the spring 43 and force the valve member 16 downwardly.

A pneumatic motor generally designated by the numeral 55 is arranged above valve stem 19 for forcing it downwardly, said motor 55 being connected by a flexible metallic tube 56 to the control piping connection 57 in the motor base member 47. To give the flexibility desired, this tubing preferably makes two turns around the stem portion of the valve although only a single turn is illustrated. Pneumatic motor 55 includes a flanged member 59 having an air chamber 60 and an outwardly extending sealing ring portion 61 over which the outer edge of diaphragm 62 is securely held by a clamping ring 63. Diaphragm 62 is formed with a suitable woven material such as Nylon impregnated with a heat resisting rubber-like material such as Neoprene, said diaphragm being molded to substantially the frustum shape shown so that its operating parts are in a non-stressed condition while the diaphragm is in its uppermost position. Diaphragm 62 is formed with a rib-like convolution around the bottom portion of its frustum shape so that movement of the diaphragm downwardly results in a rolling motion of the material forming the convolution. This arrangement gives a minimum of wrinkling and permits smooth and dependable operation. An inverted cup-like member 65 is arranged over disc member 51 to serve as a bearing plate for diaphragm 62.

To properly position pneumatic motor 55 relative to the motor base member 47, clamp ring member 63 is provided with a pair of oppositely arranged downwardly extending leg members 67 terminating in outwardly directed guide portions 68, as shown in Figures 2 and 3, said guide portions 68 being slidably arranged in recesses 69 formed in bosses 70 of base member 47. The pneumatic motor or actuator 55 is illustrated in an upper position, but the guide means are such that said actuator can be moved downwardly by an amount at least equal to the valve travel required to force movable member 16 against seat 14. The purpose of this slidable arrangement is to permit the entire motor 55 to be moved downwardly to close the valve regardless of the air pressure existing in chamber 60 of the motor.

Normal operation of the valve, however, is effected by the pneumatic actuator or motor 55 wherein variations in the air pressure in chamber 60 caused by the pneumatic control system, not shown, in cooperation with spring 43 causes expansive or contractive movements of diaphragm 62 to thus variably position valve member 16 and control the flow of heating medium through the valve.

Pneumatic motor 55 is secured in position above valve stem 19 by a rotatable cap structure generally designated by the numeral 72. Cap structure 72 includes an outer ring or handle member 73 preferably constructed of Bakelite or a similar material and having a large pitch square thread formation 74 around its inner lower portion for coacting with a mating thread formation 75 formed on the upper outer portion of base member 47. The pitch of this thread is arranged to be greater than the travel of valve member 16 from open to closed position, but the extent of the thread 74 is limited to prevent more than a single revolution of member 73, the end of the thread preventing 73 from being screwed above the position shown. An upper threaded recess 76 is formed in ring 73 for receiving an inner metal cap member 77. To prevent rotation of member 77 relative to ring 73, a portion 78 of flange 79 of the member 77 is cut to conform with a ledge 81 formed in the bottom of recess 76, this structure being shown in Figures 1 and 4. A flanged plug 82 is projected through an opening 83 in member 77 and engages the upper surface of member 59 of motor 55, a guide ring 84 formed on 59 serving to properly center said motor relative to plug 82. A spiral spring 85 engages plug 82 and holds it in its lowermost position under any normal forces applied to the structure, the spring 85 being held in place by an outer Bakelite cap member 86 threaded into recess 76 of ring 73 and then locked against turning by a set screw 87. Spring 85 is made somewhat stiffer than spring 43, so that it does not normally flex but it is sufficiently flexible to serve as a strain release means to prevent excess stress from being exerted on the valve operating structure and thereby permits valve stem 19 to be made relatively small in diameter. Downward movement of cap 72 is limited by flange 79 abutting the upper portion of member 47.

In addition to the advantages previously mentioned for the small diameter of valve stem 19, it has been found that the small stem conducts less heat to the actuator 55 than is common with conventional valves. Also, heat transfer from the valve body to the actuator 55 is hindered by the surfaces of threads 74 and 75 and by the insulating characteristics of the Bakelite material of ring 73 and cap member 86. Because of the relatively good radiating characteristics of this material and the extensive surface of these members, the heat that does pass to the cap structure is rapidly dissipated with a result that motor 55 is maintained at a much lower temperature than comparable prior art valves, and with a consequent increase in life and dependability.

The modification shown in Figures 6 and 7 is generally similar to that of the previous figures but differs therefrom in having a slightly different motor base member 87 and a different cap member 88. Motor base member 87 includes bosses 89 similar to bosses 70 previously described but having recesses 90 therein of considerably less depth than the recesses 69 shown in Figure 3. The recesses 90 are just deep enough to permit guide portions 68 of clamping ring 63 to engage the bottom of the recesses when motor means 55 is properly located above stem 19. The actuator 55 is held in place by cap 88 which engages member 59 of the motor and holds it in its normal operating position, with guide means 68 in the bottom of recesses 90. With this arrangement, wherein the pneumatic motor 55 is immovably held by cap 88, valve stem 19 can be operated only by pneumatic motor 55, with an increase in pressure forcing diaphragm 62 downwardly and thus closing valve 16 against its seat as in the previous example. Cap 88 is locked to base member 87 by projection means 91 coacting with bayonet slots 92 in base member 87, rotation of 88 being prevented by set screw 93.

Operation

The normal operation of both of these valves is obviously the same, with an increase in pressure in motor 55 overcoming spring 43 and forcing movable valve member 16 downwardly an extent depending upon the pressure exerted in chamber 60. Further, as the motor 55 of the modification of Figure 6 is immovably held by cap 88, it is obvious that the valve of this figure can be operated only by said motor. However, in the manually operable embodiment of Figure 1, motor 55 is guided by recesses 69 in base member 47 in a manner to permit a vertical travel of the motor at least equal to the movement required to close valve disc 16 against seat 14. Not only is motor 55 guided for vertical movement in base member 47, but it is likewise prevented from rotating by action of guides 68 coacting with recesses 69. This is necessary when cap means 72 is rotated for member 59 would tend to follow the rotation of the cap member unless so prevented because of the frictional engagements between cap member 86, spring 85, plug member 82 and said member 59. Because the pitch of the threads 74 and 75 is greater than the travel of valve member 16, less than one full rotation of cap 72 is sufficient to force motor 55 downwardly against the force of spring 43, regardless of the pressure existing in chamber 60, to thus close the valve. Obviously, if the pressure existing in chamber 60 is sufficient to partially close the valve, less than the previous rotative movement of the cap is effective to close the valve. Of course, fully automatic operation cannot be restored without reversing the rotative movement of cap 72 to permit spring 43 to force motor 55 back to its normal operating position.

To replace packing 21 in the valve of Figure 1 without closing off the steam lines to and from the valve, and without disconnecting the control piping from the connection 57, the cap structure 72 may be disassembled in a reverse order to the assembly procedure previously described, with set screw 87 first being removed, cap member 86 then being screwed out of ring 73, thus permitting the removal of spring 85, plug 82 and metal cap 77. Motor 55 may then be lifted upwardly and to one side of the valve structure, such motion being permitted by the flexibility of the tubing 56. Inverted cup member 65 is lifted off disc 51, disc 51 is disengaged from the valve stem 19 by sliding it to one side so that the larger portion of keyhole slot 52 may be slid over the end of the valve stem, and the disc 51, spring 43 are removed. With spring 43 out of the way, a suitable tool can be applied to tool engaging portion 41 of sleeve 27 to rotate it in a direction to screw it downwardly so that conical seat 34 will engage mating portion 35 of enlargement 18 of valve stem 19 and thus force valve member 16 downwardly.

When sleeve 27 is screwed sufficiently far into outer sleeve 29 to force valve member 16 tightly against seat 14, surface 34 will also be sealingly engaging surface 35. With valve disc 16 against seat 14, leakage is prevented into valve passage 17 from inlet 11 by said valve disc; with surface 34 engaging 35, leakage is prevented from the passage 12 along the valve stem by the engagement of said surfaces, and leakage is prevented between sleeves 27 and 29 by the threaded engagement between said sleeves. While it is possible that there may be a slight leakage between the threads, this is of little consequence and does not interfere with the subsequent operations. With leakage of steam from the valve thus being substantially prevented, and because the sealing means just described are independent of and below packing 21, retainer 22, including packing 21, ring 23, spring 24 and adjusting nut 25 can be removed as a unit by applying a suitable tool to portion 30 of the retainer 22 and screwing it out of sleeve 27 and slipping it off of stem 19. Then, by removing adjusting nut 25 from sleeve 22, spring 24, ring 23 and packing 21 can be shaken out or otherwise removed; new packing substituted, and the parts reassembled. The retainer 22 with its new packing is then slipped back over stem 19 and screwed into the upper recess of sleeve 27 as before described. By using a right hand thread between retainer sleeve 22 and inner sleeve 27 and a left hand thread between sleeve 27 and sleeve 29, rotation of portion 30 of sleeve 22 in one direction, once sleeve 27 has been loosened slightly by applying a tool to portion 41, will drive sleeve 27 in the desired direction and then, on sleeve 27 being stopped by engagement of flange 38 with sleeve 29 or by engagement of surface 34 with conical surface 35, further rotation of 30 will then either remove or tighten, as the case may be, retainer 22 relative to sleeve 27. However, this is only a matter of convenience and all threads may be of the same sort if desired.

Although it is suggested that retainer sleeve 22 be screwed out of sleeve 27 and slipped over stem 19 before further disassembly, it is obvious that nut 25, spring 24 and ring 23 may be removed with retainer sleeve 22 in place, the packing 21 dug out by a suitable tool, new packing replaced, and the parts reassembled as before. Although this latter mode of changing the packing does not require that the retainer sleeve 22 be separate from sleeve 27, it is preferred that the retainer sleeve with all its parts be removed prior to changing the packing for not only is the packing more easily changed when readily accessible, but also there is less chance of damage to the small and polished stem 19.

Instead of disassembling cap structure 72 as described, and where it is flexible to disconnect the control piping, set screw 48 may be loosened and the upper body portion 47 and cap structure 72 then removed. The subsequent removal of motor 55 and other parts will be the same as above described.

The packing is changed in the valve of Figure 6 in very much the same manner as above described, with the exception that set screw 93 is first removed, cap 88 is rotated sufficiently to disengage projection 91 from bayonet slot 92, and the cap is then removed. This permits motor 55 to be lifted to one side with the subsequent operation of changing the packing being exactly the same as before.

Upon changing the packing and reassembling retainer 22 in sleeve 27, sleeve 27 is then threaded back up into sleeve 29 by a continued turning of portion 30 of sleeve 22 or by applying a suitable tool to portion 41 of sleeve 27, sleeve 27 being screwed up into 29 until flange 38 sealingly engages the bottom of sleeve 29. The restoration of sleeve 27 to its original position permits valve member 16 to be pushed off seat 14 by steam flow and, upon a subsequent reassembly of disc 51 and spring 43 with stem 19, the valve will be held in a fully open position. Motor 55 is then placed over cup member 65 and the cap means reapplied in a manner reverse to the disassembly described, or in the same manner as first related.

While the present invention is illustrated in its application to a pneumatically operated steam or hot water valve, it is obviously useful with other types of manual or motor operated valves, and the features of novelty herein described may be incorporated wherever found suitable.

I claim:

1. A valve comprising a main body having a passage therethrough, a seat portion within said body, a movable valve member for coacting with said seat portion, a stem member for actuating said valve member, said stem member having an enlarged portion, an outer threaded member attached to said main body, an inner sleeve member concentric with said stem member and threaded into said outer member, a retainer sleeve member threadedly engaging said inner sleeve member and also concentric with said stem member, and packing arranged between said retainer sleeve member and said stem member, said inner sleeve member including means for engaging the enlarged portion of said stem member and for forcing said stem member and valve member downwardly against said seat when said inner sleeve member is screwed downwardly from its normal position in said outer member, the engagement of the valve member against the valve seat sealing off one end of the passage through the valve and the engagement of the inner sleeve means with the enlarged portion of the stem sealing off the retainer sleeve from the other end of said passage.

2. A valve comprising a main body member having a seat portion, an upper body member attached to said main body member, a movable valve member for coacting with said seat portion, a valve stem for actuating said movable member, a generally cylindrical sleeve member concentric with said valve stem and threaded into said upper body member, and a retainer sleeve member threaded into said cylindrical sleeve member and arranged concentric with said valve stem, said retainer sleeve member having a recess for packing for said valve stem, said cylindrical sleeve member having means for forming a sealing engagement with said upper body portion and having other means for effecting a seal to prevent leakage along said valve stem, said cylindrical sleeve member being moveable downwardly far enough to force said valve member into engagement with said seat portion.

3. In a valve construction, a main body portion having a seat, a movable valve member and operating stem therefor, an upper body portion attached to said main body portion, a sleeve member threaded through said upper body portion and adjustable between an upper normal position and a lower position in which it forces said valve member against said seat, a packing retainer attached to said sleeve member and including packing means for forming a sealing connection with said valve stem, said sleeve member also including means for forming a seal between said sleeve member and said stem independent of and below said packing means.

4. A valve comprising a main body portion having a passage therethrough, a seat in said body portion and across said passage, a movable valve member for coacting with said seat portion, a movable valve stem member for actuating said valve member, packing arranged around said stem member, a retainer sleeve member concentric with said stem member for holding said packing in place, an inner sleeve member to which said retainer sleeve member is secured, said inner sleeve member also being concentric with said stem member, and an upper body portion secured to said main body portion, said inner sleeve member being threaded through said upper body portion, said inner sleeve member including an outwardly extending flange for normally engaging said upper body portion in sealing relation, said inner sleeve member also including means for forcing said valve member against its seat portion and for making a sealing engagement with one of said movable members when it is threaded downwardly from its normal position in said upper body portion.

5. A valve including a body, a valve seat, a movable valve member for coacting with said seat, a valve stem for actuating said valve member, said valve stem having an enlarged lower portion, packing for said valve stem, a first sleeve member for holding said packing in proper relation to said stem, and a threaded sleeve member arranged between said first sleeve member and said body, said threaded sleeve member including means for engaging the enlarged lower portion of said valve stem when said threaded sleeve member is screwed down into the valve body in a manner to force said movable member against its seat.

6. A valve having a body with a passage therethrough, a seat portion in said body and across said passage, a movable valve member, a stem member for actuating said valve member, packing means for said stem member, means for engaging aid stem member above said packing for actuating said valve member to open and closed positions, and means for engaging said stem member below said packing for actuating said valve member to a closed position and for forming a seal with said stem member.

7. A pressure actuated valve comprising, in combination, a main body portion having a passage therethrough, a valve seat in said passage, a movable valve member, a movable stem member for actuating said valve member, an upper body portion attached to said main body portion, retainer means attached to the upper end of said stem, compression spring means arranged between said upper body portion and said retaining means for urging said stem and said valve member to a fully open position, threaded sleeve means extending through said upper body portion and concentric with said stem member, a retainer sleeve member attached to said threaded sleeve member and also concentric with said stem member, said retainer sleeve member carrying packing for sealingly engaging said stem member, said threaded sleeve member also including means for engaging one of said movable members in sealing relation when said threaded sleeve member is screwed down from its normal position, a motor base member mounted on said upper body portion, an expansible and contractible pneumatic motor means arranged above and in engagement with said valve stem member, means for mounting said pneumatic motor means in slidable relation to said motor base member, and movable cap means for varying the position of said motor means to a sufficient extent to force said valve member against its seat even though the pneumatic motor means is in a contracted condition.

8. A valve construction comprising a main body member, an upper body portion attached to said main body member, a valve stem extending through said upper body portion, removable packing for said valve stem, a motor base member attached to said upper body portion, conduit connection means in said base member, a pneumatic motor means for engaging said valve stem removably secured to said base member, and flexible conduit means extending between said conduit connection means and said motor means to permit said motor means to be moved from engagement with said valve stem sufficiently to permit removal of said packing without movement of said motor base member.

9. A valve structure comprising a body member, a valve seat within said body member, a movable valve member engageable with said seat, a stem means for operating said movable member, motor means for exerting force on said stem and thereby actuating said valve member, manual means for exerting force on said stem for actuation of said valve member without regard to said motor means, and spring loaded strain release means arranged between said manual means and said stem means.

10. A valve structure comprising a body member, a valve seat within said body member, a movable valve member for coacting with said seat, a stem means for operating said movable member, spring means for urging said movable member away from said valve seat, motor means for exerting force on said stem means for causing said movable valve member to engage said seat, manual means for exerting force on said valve stem for closing said valve, and second spring means arranged between said manual means and said stem means, said second spring means being stiffer than the first named spring means but weak enough to deflect before excess stress can be imposed on said valve stem.

11. A valve construction comprising, a valve body having an operating stem projecting therefrom, a motor base member attached to said valve body, said base member including guide means, an upper unitary motor means for actuating said valve stem, said motor means including a guide member for coacting with said guide means for movably positioning said motor means relative to said base member, and cap means for holding said motor means in a predetermined position relative to said base member, said motor means being disengageable from said stem upon removal of said cap means.

12. A valve construction comprising, a valve body having an operating stem projecting therefrom, a base member attached to said valve body, said base member including guide means extending parallel to said stem, an upper unitary power actuator for actuating said valve stem, said actuator including a guide member for coacting with said guide means for movably positioning said actuator relative to said base member, and cap means for rigidly securing said actuator in operative position relative to said base member, said actuator being arranged between said cap means and said stem and removable as a unit upon removing said cap means.

13. A valve construction comprising, a valve body having an operating stem projecting therefrom, a base member attached to said valve body, said base member including guide means, an upper power actuator for actuating said valve stem, said actuator including a guide member for coacting with said guide means for movably positioning said actuator relative to said base member, and manually adjustable cap means for normally holding said actuator in one position relative to said base member but operable to move said actuator relative to said base member sufficiently to move said valve stem from one extreme position to its opposite position.

14. A pneumatically operated valve including a body portion and a valve member movable by a valve stem, an actuator for said stem comprising a flanged member having an air connection, means for holding said actuator in a predetermined position relative to said stem, and flexible diaphragm means attached to said flanged member in sealing relation, said diaphragm being molded in the shape of a frustum of a hollow cone and having an outwardly extending attaching portion near its base and having a downwardly extending rib-like convolution between said base and said attaching portion.

15. In a pneumatic actuator for a valve, a substantially concave actuator member having a peripheral flange, a substantially convex flexible diaphragm arranged in spaced relation to and extending into said concave member, said diaphragm being formed in the shape of a frustum of a hollow cone with an outwardly extending attaching flange near its base and having a downwardly extending rib-like convolution between the base and the attaching flange, and means for clamping said attaching flange to said peripheral flange.

16. A valve comprising a body portion, a movable valve member having an operating stem therefor, an actuator for said stem, and attaching means including an adjustable cap means for securing said actuator to said body portion and for actuating said stem through said actuator, said cap means being constructed of a material having good heat radiating characteristics and relatively poor heat conductivity so that the temperature rise of said actuator when said body portion is heated will be a minimum, said cap means having a ribbed edge portion for a non-slip grip and for increasing its heat radiating area.

PETER P. DEMAY.

References Cited in the file of this patent

UNITED STATES PATENTS

| Number | Name | Date |
|---|---|---|
| 893,124 | Atkinson | July 14, 1908 |
| 1,332,310 | Shaver | Mar. 2, 1920 |
| 1,875,387 | Mackintosh | Sept. 6, 1932 |
| 1,976,796 | Milner | Oct. 16, 1934 |
| 2,019,257 | Gibbs | Oct. 29, 1935 |
| 2,040,591 | Barrett | May 12, 1936 |
| 2,061,028 | Forbes | Nov. 17, 1936 |
| 2,241,056 | Chilton | May 6, 1941 |
| 2,264,677 | Oxland | Dec. 2, 1941 |
| 2,295,774 | Corydon | Sept. 15, 1942 |